Patented Feb. 6, 1940

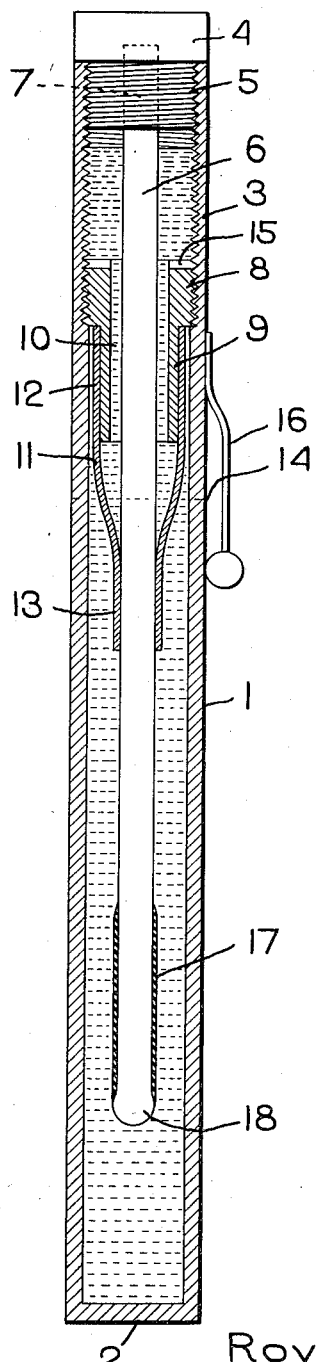

2,189,061

UNITED STATES PATENT OFFICE 2,189,061

COMBINED CLINICAL THERMOMETER AND STERILIZER THEREFOR

Roy A. Faye, Watertown, and Alexis L. Draper, Dorchester, Mass.

Application April 8, 1938, Serial No. 200,968

5 Claims. (Cl. 206—16.6)

This invention relates to improvements in sterilizing mechanism for clinical thermometers, and the general object of the invention is to provide a combined clinical thermometer and case therefor containing a sterilizing fluid and so constructed as to insure prompt and complete sterilization of the thermometer after it has been used, thereby preventing transmission of germ diseases from one patient to another.

One of the principal objects of the invention is to provide a casing, for a clinical thermometer, adapted to contain a sterilizing fluid and having a cap or closure to which the thermometer is fixedly attached.

A further object of the invention is to provide a tubular casing for the thermometer having means dividing it into two sections and acting to retain a liquid sterilizing solution in the lower section when the thermometer is removed from the casing, and to permit the fluid displaced from the lower section upon insertion of the thermometer to enter the upper section of the casing when the thermometer is inserted in the casing, thereby insuring the complete sterilization of the thermometer throughout its entire length.

Another object of the invention is to provide an apparatus of the character specified in which the portion of the thermometer which is placed in the mouth of the patient is enclosed in a protective sheath which will prevent breakage of the thermometer by the teeth of the patient, but will be of such a character as to permit the thermometer to be introduced and withdrawn through the partition member within the casing.

These and other objects and features of the invention will more fully appear from the following description and the accompanying drawing and will be particularly pointed out in the claims.

The drawing illustrates mainly in vertical section an enlarged view of a preferred embodiment of the invention, the thermometer being illustrated in full lines.

The construction illustrated comprises a hollow tubular preferably cylindrical casing 1 having an integral closed bottom 2 and an open upper end, a section of the upper end being provided with internal screw threads 3, thereby providing a chamber of larger diameter than the diameter of the lower section of the casing. The upper end of the casing is provided with a closure or cap 4, preferably in the form of a narrow cylinder of the same external diameter as the casing and provided with an extension 5 having screw threads complementary to the screw threads 3 of the upper section of the casing. A clinical thermometer 6 is fixedly secured at its upper end within a suitable axial recess 7 in the cap, so that when the cap is applied to the casing the thermometer will extend axially downwardly into the casing.

Suitable means are provided for dividing the casing into upper and lower sections, the partitioning means being so constructed as to permit insertion and removal of the thermometer and effectively to prevent flow of liquid from the casing when the thermometer has been removed.

In the preferred construction illustrated the means for dividing the casing into upper and lower sections comprises an externally screw threaded cylindrical tubular member or nut 8 having screw threads complementary to the internal screw threads 3 of the casing and having an integral extension 9 of somewhat smaller diameter. The bore 10 of this tubular or partition member is of somewhat larger diameter than the diameter of the thermometer 6, so that the thermometer may be readily inserted through it. An elastic tubular porous wick 11, preferably of knitted or braided cotton or other highly absorbent material having a collapsible lower end portion provided with a restricted opening at its apex, is fitted at its upper end 12 upon the extension 9 of the tubular partition member and is fixedly secured thereto. The tubular wick is so constructed that its lower end portion 13 will completely or almost completely contract when not expanded and thereby effectively close the opening at the apex thereof.

The casing preferably is of transparent material as above stated and is provided with a line or other index 14 to indicate the proper level of the sterilizing liquid when the thermometer is removed from the casing.

In assembling the parts above indicated the tubular wick 11, is slipped over the reduced end portion of the tubular member or nut 8 and the nut then screwed downwardly in the upper section of the casing, suitable slots or recesses 15 desirably being provided for engagement with the spanner wrench or other suitable tool. The nut is screwed down to the end of the screw threaded portion. The lower section of the casing is then filled with a suitable sterilizing solution, such as alcohol, or if the casing is made of a material which is not resistant to alcohol, some other suitable sterilizing solution may be employed. When in this position the lower end of the moistened tubular wick member will normally contract until the lower end is effectively closed. The thermometer is then inserted through the aperture 10 of the tubular member 8 and as it is forced downwardly expands the lower end portion 13 of the wick so that a substantial portion of it embraces and wipes the thermometer. The bulb and a substantial portion of the thermometer pass through the constricted opening in the lower end of the wick into the antiseptic solution, thus insuring complete sterilization of all portions of the thermometer which have contacted with the patient. As the thermometer is thus forced downwardly the solution in the lower section of the casing will be displaced in proportion to the mass of the thermometer and will be forced upwardly through the porous wick and through the passage 10 in the tubular member 8 into the upper section of the casing, so that when the cap is completely applied to the upper end of the casing the thermometer will be submerged in the sterilizing liquid practically throughout its entire length and any motion which is given to the thermometer will cause the liquid to envelop the entire length of the thermometer, thereby insuring its complete sterilization.

When the cap is unscrewed and removed and the thermometer withdrawn the liquid will descend from the upper section of the casing until it resumes its former level. As soon as the thermometer has been withdrawn from the lower end of the wick the lower end will contract by reason of its elasticity in such manner as substantially to prevent flow of the liquid from the casing, so that the thermometer casing may even be laid down flat without the loss of any substantial amount of liquid.

Desirably the thermometer case is provided with a clip 16 adapted to engage the wall of a physician's pocket and the thermometer casing is normally retained thereby in a substantially vertical position.

By reason of this construction a physician may unscrew the cap and remove the thermometer from its casing to take the temperature of his patient and after reading the thermometer replace it in the casing in the manner aforesaid without the loss of any sterilizing liquid and of course insuring prompt and complete sterilization of the thermometer.

Inasmuch as clinical thermometers are frequently used to take the temperature of children and of people who are somewhat careless or even demented, danger of breakage of the thermometer and shattering of the glass thereof in the mouth is always present. Another feature of the invention is to provide a clinical thermometer of the character specified with a protective covering which will minimize the likelihood of breakage of the thermometer and if the thermometer is broken will prevent shattering of the glass within the patient's mouth. In the present invention the thermometer is provided with a coating 17 of rubber extending upwardly from the bulb 18 of the thermometer such a desirable distance as may be effective to prevent breakage or shattering of the glass of the thermometer. This rubber coating may be of sufficient thinness and so tapered at its ends as not to interfere with the insertion and removal of the thermometer through the contracted end 13 of the wick 11.

It has been found by trial that whereas the use of a protective sheathing of metal and certain other materials will affect the accurate reading of the thermometer, a shield of rubber tubing or rubber cement will have no effect upon the accuracy of the reading of the thermometer, hence the use of rubber is preferred. Furthermore, such a rubber sheath forms a soft covering which can be lightly grasped by the teeth of the patient to retain the thermometer in proper position in the mouth, thereby insuring more accurate measurement of the temperature.

While the mechanisms herein described are of a preferred form, it will be readily understood that various modifications can be made within the spirit and scope of the following claims, for example, the cap may be frictionally held in place by a bayonet joint or the like, or other mechanisms for dividing the casing into upper and lower sections having the attributes above described may be provided. The casing need not but preferably is made of transparent material of such character as not to be readily broken. Other changes may be made in the construction and arrangement of parts within the knowledge of those skilled in the art within the meaning and scope of the following claims.

Having thus described the invention, what is claimed as new, and desired to be secured by Letters Patent, is:

1. A clinical thermometer sterilizing device comprising a tubular casing to receive the thermometer having a closed bottom, and a removable cap, a short downwardly extending partition of elastic porous material dividing the casing into upper and lower sections and having a collapsible portion with a constricted opening at its lower end to permit insertion and withdrawal of the thermometer therethrough, and a sterilizing liquid substantially filling said lower section, said partition acting to permit displacement of liquid from the lower section into the upper section by the thermometer when introduced and restoration of the liquid to the lower section when the thermometer is withdrawn and thereafter effectively to prevent liquid from flowing from said casing.

2. A clinical thermometer sterilizing device comprising a tubular casing to receive the thermometer having a closed bottom, a cap for said casing, a short elastic wick of porous material secured in the upper portion of said casing having a tubular section provided with a constricted opening at its lower end adapted to embrace the thermometer when introduced into the casing and to permit the liquid displaced by the thermometer to pass into the upper portion of the casing and upon withdrawal of the thermometer and restoration of the liquid to the lower portion of the casing when the thermometer is withdrawn and thereafter effectively to prevent escape of liquid from said casing.

3. A clinical thermometer sterilizing device comprising a tubular casing to receive the thermometer having a closed bottom, and an internally threaded upper section of larger internal diameter than that of the lower section, a cap for closing the upper section, an externally threaded tubular member seated in said enlarged section having a downwardly extending cylindrical portion of reduced diameter and having at its upper end means adapted to be engaged by a suitable tool to rotate said tubular member, a short tubular wick of elastic material embracing and secured to said reduced portion and having a contracted portion extending downwardly therebeyond provided at its lower end with a constricted opening, adapted to fit upon the thermometer when inserted therethrough, a cap for said casing having a thermometer fixedly secured thereto and a sterilizing liquid substantially filling the lower end of said casing, said wick acting to wipe the thermometer when introduced and to permit displacement of the liquid from the lower section into the upper section and upon withdrawal of the thermometer to permit restoration of the liquid to the lower section and thereafter effectively to prevent flow of the liquid from said casing.

4. A clinical thermometer sterilizing device comprising a tubular casing of transparent material to receive the thermometer having a closed bottom, and a removable cap, a partition of elastic porous material dividing the casing into upper and lower sections and having a collapsible portion provided with a constricted central aperture to permit insertion and withdrawal of the thermometer therethrough, and a sterilizing liquid substantially filling said lower section, said partition acting to permit displacement of liquid from the lower section into the upper section by the thermometer when introduced and restoration of the liquid to the lower section when the thermometer is withdrawn and thereafter effectively to prevent liquid from flowing from said casing, and means on said transparent casing to indicate the proper level of the liquid in said lower section when the thermometer is removed from said casing.

5. A clinical thermometer sterilizing device comprising a tubular casing to receive the thermometer having a closed bottom, a cap for said casing, a short, downwardly extending elastic wick of porous material secured in the upper portion of said casing having a tubular section provided with a constricted opening at its lower end adapted to embrace the thermometer when introduced into the casing and to permit the liquid displaced by the thermometer to pass into the upper portion of the casing and upon withdrawal of the thermometer and restoration of the liquid to the lower portion of the casing when the thermometer is withdrawn and thereafter effectively to prevent escape of liquid from said casing, and a protective sheath of unbreakable material surrounding the lower end portion of said thermometer and extending from the bulb thereof a substantial distance upwardly and so formed as not to interfere with the passage of the lower portion of said thermometer through said wick.

ROY A. FAYE.
ALEXIS L. DRAPER.